S. R. HART.
STUMP PULLER.
APPLICATION FILED OCT. 3, 1908.
961,074.
Patented June 7, 1910.
2 SHEETS—SHEET 1.
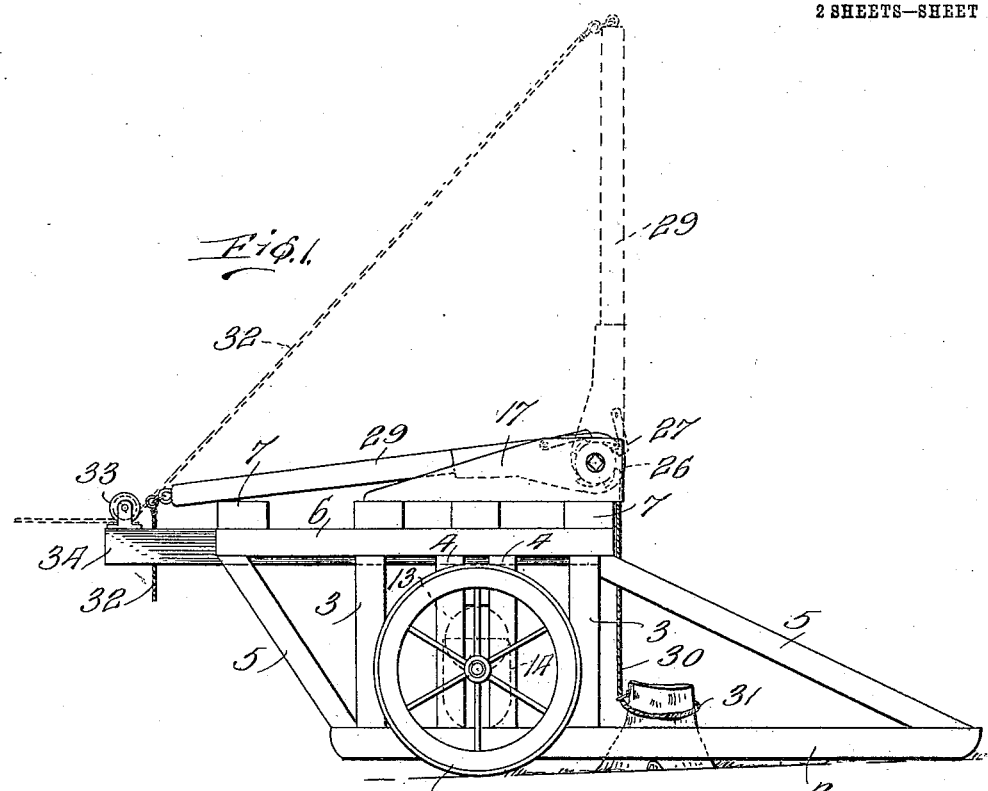
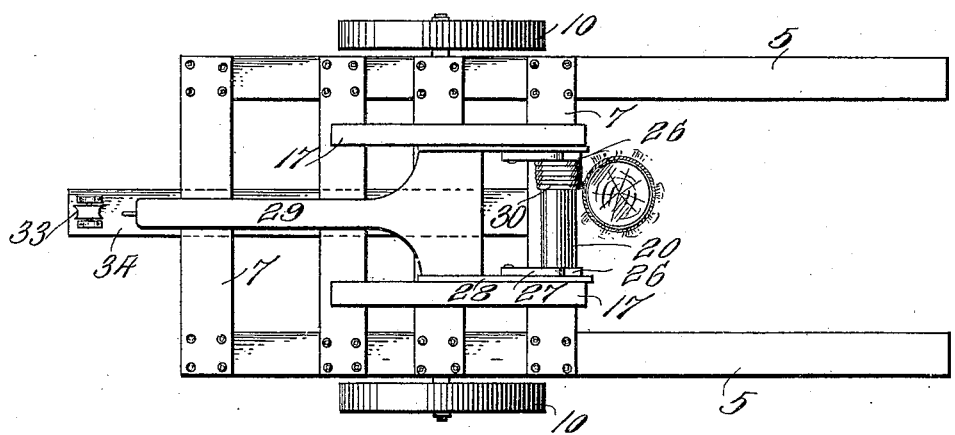
Witnesses
F. C. Gibson
Jas. A. Kochl
Inventor
Samuel R. Hart,
By Victor J. Evans
Attorney

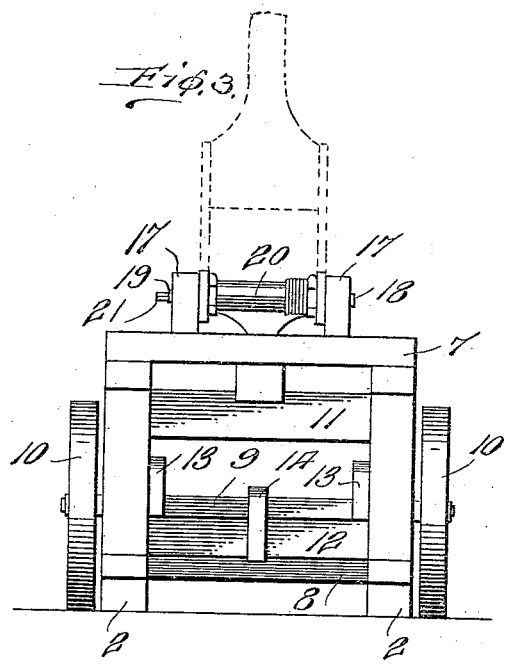
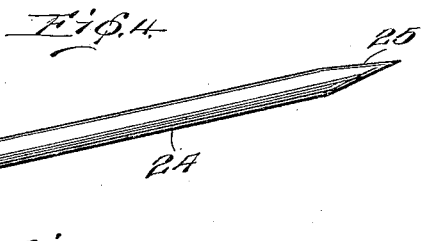
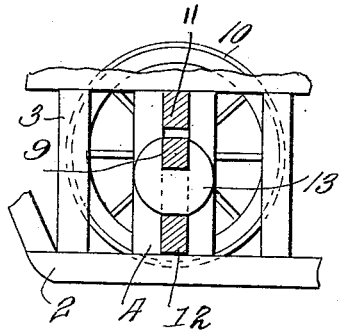
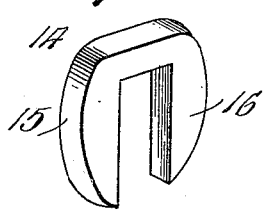
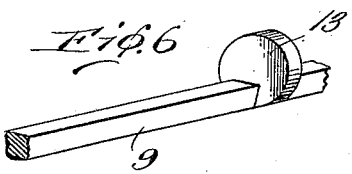

UNITED STATES PATENT OFFICE.

SAMUEL R. HART, OF ANDALUSIA, ALABAMA.

STUMP-PULLER.

961,074.   Specification of Letters Patent.   Patented June 7, 1910.

Application filed October 3, 1908. Serial No. 456,082.

*To all whom it may concern:*

Be it known that I, SAMUEL R. HART, a citizen of the United States, residing at Andalusia, in the county of Covington and State of Alabama, have invented new and useful Improvements in Stump-Pullers, of which the following is a specification.

This invention relates to stump pullers, and has for an object to provide a portable machine of this character which when in operation may be effectively held stationary, and which will include means for effectively extracting stumps with but little exertion on the part of the draft animal or operator.

A further object of this invention is to provide a wheeled frame upon which the extracting means is mounted, and to provide simple and effective means for lowering the frame so that the wheels will be out of contact with the ground during the process of extracting.

Other objects and advantages will be apparent as the nature of the invention is better set forth, and it will be understood that changes within the scope of the claim may be resorted to without departing from the spirit of the invention.

In the drawings, forming a portion of this specification and in which like numerals of reference indicate similar parts in the several views:—Figure 1 is a side view of the stump puller showing the frame in position prior to extracting the stump. Fig. 2 is a top plan view, Fig. 3 is a front end view, Fig. 4 is a perspective view of the drum lever, Fig. 5 is a perspective view of the key, Fig. 6 is a perspective view of a portion of the axle and one of its cams, Fig. 7 is a detail section through a portion of the frame showing the axle in its raised position.

Referring now more particularly to the drawings, there is shown a stump puller 1 comprising a frame consisting of longitudinally disposed parallel spaced runners 2, vertically extending posts 3 upon each runner, and intermediate spaced posts 4 upon each runner. Diagonally disposed posts 5 are also connected to the runners at the front and rear ends thereof, and these posts and the previously described posts 3 and 4 support longitudinally extending beams 6 located directly above the runners, and the said beams have secured thereto transversely extending beams 7. The runners are braced by means of a transversely extending beam 8 located preferably at the rear end of the machine. The posts 4 upon each runner are constructed in a manner so that they serve as a bearing box and are adapted to receive a sliding axle 9 provided at its outer ends with ground wheels 10. An upper transversely extending beam 11 is secured at its ends between the posts 4 and a transversely extending beam 12 is secured at its ends between the said posts at the lower end of the frame. The axle 9 is preferably of square form intermediate of its ends and has secured thereto inwardly of the posts 4 cams 13 which when the same are in the position shown in Fig. 7 are out of engagement with the beam 11 so that the wheels of the machine are in an elevated position. In this position of the cams it will be seen their peripheral faces engage the beam 12. To hold the axle against rotation I provide a key 14 preferably of inverted U-form which is provided with parallel spaced legs 15 and 16 adapted to straddle the axle 9 and the beam 12. It will be seen that when the key 14 is removed, the axle 9 may be revolved so that the working faces or peripheral edges of the cams may engage the beam 12 as described above, so that the wheels 10 are elevated above the runners 2. When in this position it will be seen that the frame of the machine is securely held in a fixed position.

Journal boxes 17 are mounted upon a plurality of the beams 7 and receive trunnions 18 and 19 of a drum 20. The trunnion 19 is preferably provided with a squared extension 21 so that it may receive the slotted end 22 of a head 23 formed upon an operating lever 24. The lever 24 is provided with a pointed end 25 which may be inserted in the ground beneath the runners should it be desired to raise or lower the frame of the machine. The drum 20 is provided inwardly of the journal boxes 17 with ratchet wheels 26 adapted to be engaged by pawls 27 pivotally mounted to the arms 28 of a forked lever 29. It may be mentioned that the arms of the forked lever are loosely mounted upon the trunnions at the ends of the drum and the said lever is thus mounted for oscillatory movement. The drum has secured thereto one end of a cable or similar flexible element 30 which is wound above the said drum and which is thus disposed or arranged so that it may be looped at its free end as shown at 31 and engaged with a stump as shown at Figs. 1 and 2 of the drawings, the said stump being located between the runners 2. The lever 29 has secured thereto a cable or the like 32 which may be passed beneath a pulley 33 mounted upon a longitudinal extending pole 34 carried by the frame 1. It will thus be seen that one end of the cable 32 may be attached to a draft animal, and in movement of the animal away from the machine the lever, as shown in the dotted line position in Figs. 1 and 3, will be moved into the position shown in full lines in Fig. 1, which movement of the said lever will effectively operate the drum 20 to wind thereon the cable 30 as will be readily understood. To assist the animal the lever 24 may be engaged with the end 21 of the drum as described, but it is not absolutely necessary.

It will be understood that when the wheels 10 are in their lowered positions the frame of the apparatus is partly supported by the runners 2 which, when the wheels are in the just named positions rest at their rear ends upon the surface of the ground. In addition to the frame being supported by the runners, it is also supported by reason of the fact that the cams 13 are engaged with the beam 11 hereinbefore described.

I claim:—

A stump puller comprising a frame, a vertically movable wheeled axle carried by the frame, spaced beams carried by the frame arranged above and below the said axle, cams upon the axle adapted to be engaged with the uppermost beam to hold the wheels of the axle in their lowered positions, said cams being adapted for engagement with the lowermost beam for holding the axle against rotation, and stump extracting means carried by said frame.

In testimony whereof I affix my signature in presence of two witnesses.

SAMUEL R. HART.

Witnesses:
W. D. TAYLOR,
C. D. BEAN.